United States Patent [19]

Eldred

[11] 4,340,196

[45] Jul. 20, 1982

[54] MAINTENANCE LOCK FOR AIRCRAFT SPEED BRAKE

[76] Inventor: Thomas W. Eldred, 298 6th St., Hill AFB, Utah 84056

[21] Appl. No.: 147,426

[22] Filed: May 6, 1980

[51] Int. Cl.³ ............................................ B64D 47/00
[52] U.S. Cl. .......................... 244/1 R; 16/DIG. 17; 16/49; 70/94; 403/44; 244/224; 292/338; 254/101
[58] Field of Search ..................... 244/1 R, 224, 129.1, 244/213, 215, 217, 113; 403/43, 44, 46; 248/354 S, 357; 292/338, 339; 49/276, 366; 43/94; 29/239; 254/39, 101; 410/143–148; 16/DIG. 17, 49, 82, 86; 70/94; 74/526

[56] References Cited

U.S. PATENT DOCUMENTS

| 502,200 | 7/1893 | Pearson | 254/101 |
| 704,403 | 7/1902 | Thill | 248/354 S |
| 1,623,925 | 4/1927 | Kinzer | 43/97 |
| 1,951,660 | 3/1934 | Klaudt | 248/354 S |
| 2,031,177 | 2/1936 | Northrop | 244/217 |
| 2,319,463 | 5/1943 | Lear | 254/101 |
| 2,741,821 | 4/1956 | Findley | 248/354 S |
| 3,180,013 | 4/1965 | Rote | 29/239 |
| 3,923,220 | 12/1975 | Marcyan | 403/43 |

Primary Examiner—Galen L. Barefoot
Attorney, Agent, or Firm—Donald J. Singer; Robert Kern Duncan

[57] ABSTRACT

Disclosed is a lock to lock open the speed brake doors of an aircraft to facilitate servicing the brake mechanism. The lock cooperates with lightening holes in the internal stiffening structure of the speed brake. The lock is adjustable to provide different amounts of brake opening. Surfaces of the lock that contact the aircraft speed brake structure are fabricated of resilient material to protect the aircraft.

2 Claims, 4 Drawing Figures

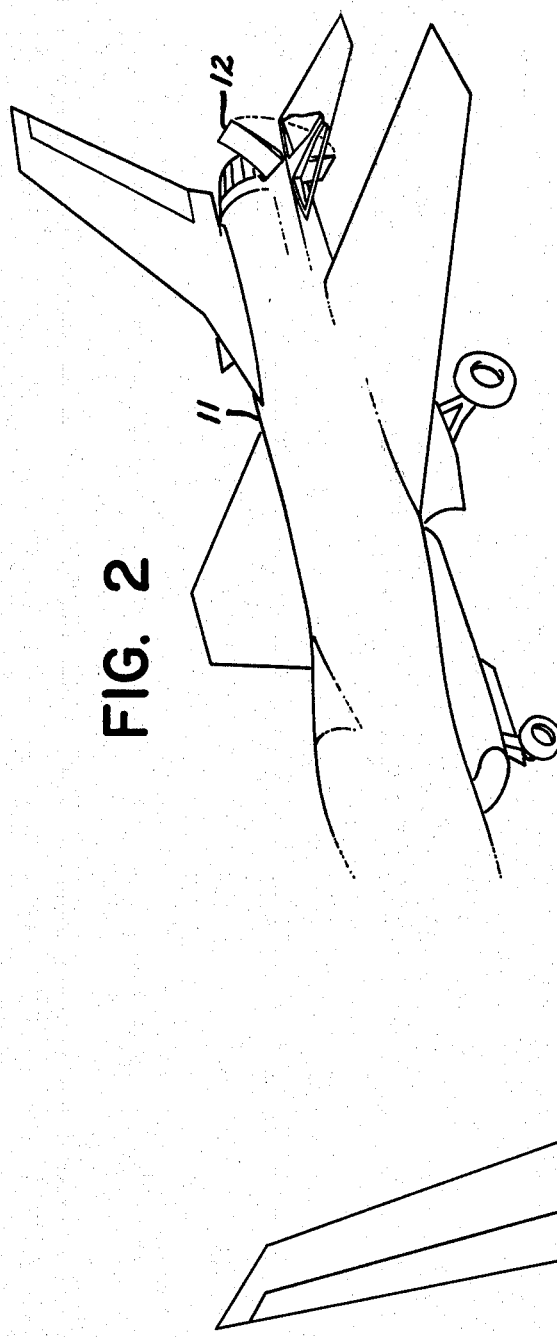
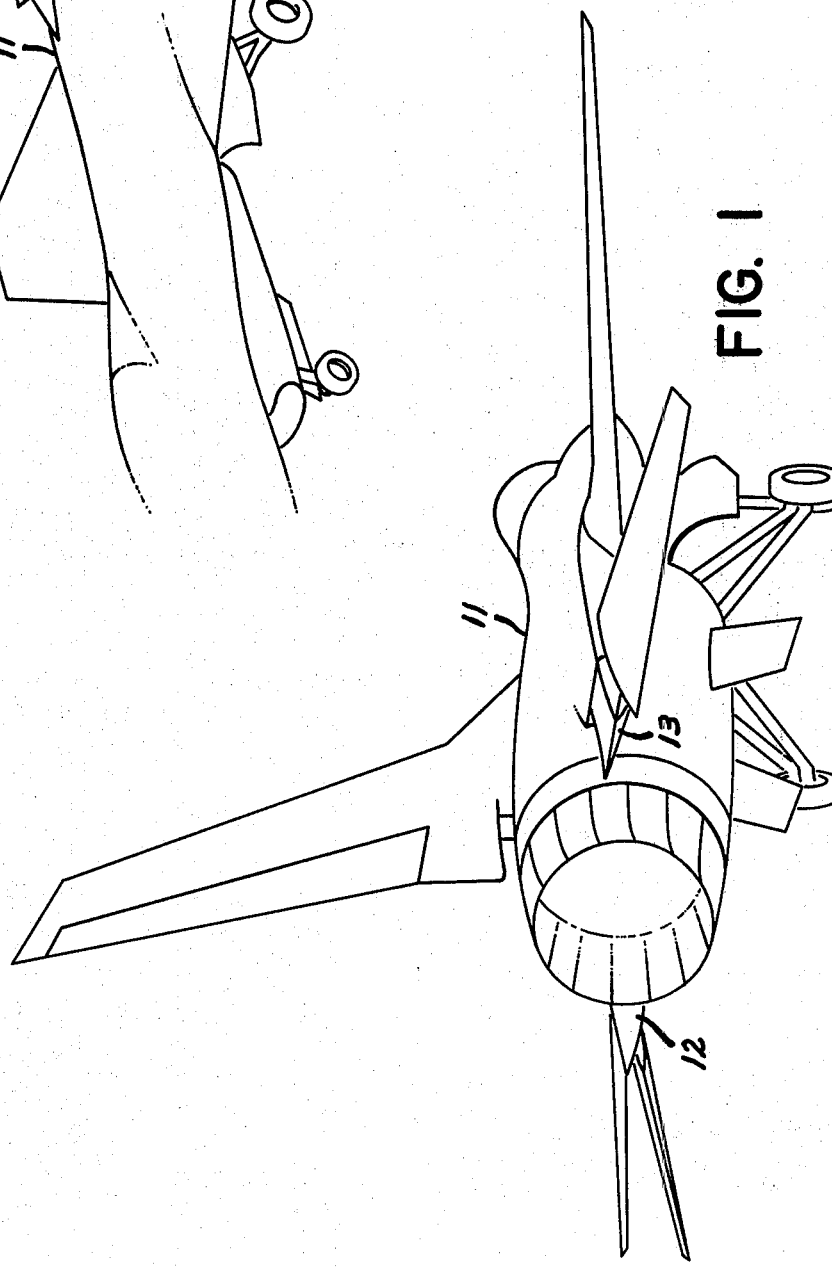

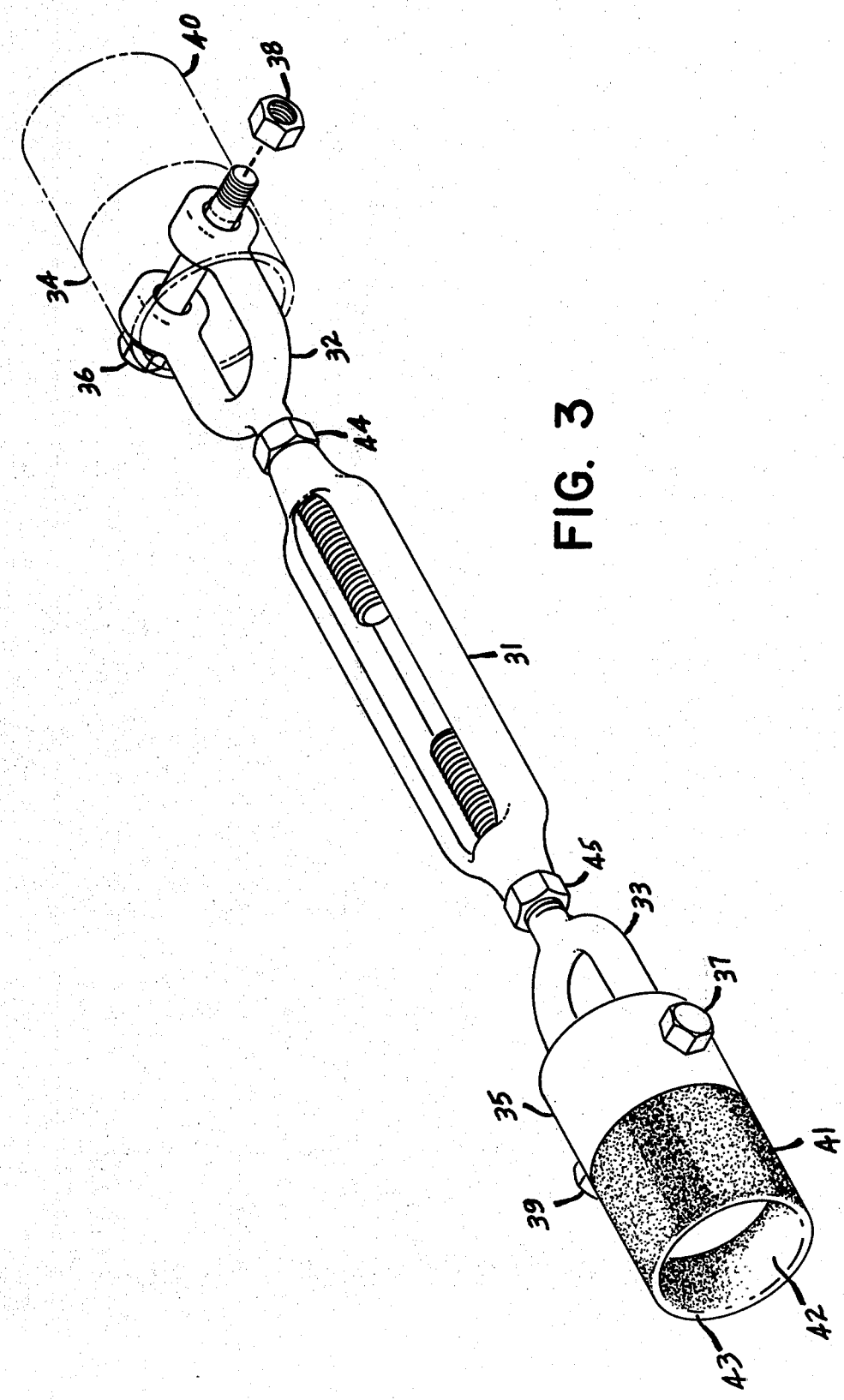

MAINTENANCE LOCK FOR AIRCRAFT SPEED BRAKE

RIGHTS OF THE GOVERNMENT

The invention described herein may be manufactured and used by or for the Government of the United States for all governmental purposes without the payment of any royalty.

BACKGROUND OF THE INVENTION

Many aircraft have speed brakes to enable the aircraft to lose velocity at a higher rate while landing. Generally, these speed brakes consist of a protrudence that is opened out into the airstream flowing over the ship and provides an increased aerodynamic drag. Generally, speed brakes occur in pairs, one on each side of the fuselage to balance the drag effects. Typically, the speed brakes are in the form of opposing doors which in a closed position fair in with the skin contours of the aircraft. Requirements exist to lubricate the movable mechanisms of the speed brake doors and the associated mechanical linkage assemblies. In the present state of the art, in order to provide a reasonably safe, reliable, method of retaining the speed brakes in approximately the full open position while performing the lubrication, at least two and preferably three persons are required. One person holds the speed brake doors open against residual hydraulic pressure while another person performs the lubricating with the third person available to relieve the first. With three persons performing the task, the area is very congested.

SUMMARY OF THE INVENTION

The invention provides a tool for holding the speed brake doors of an aircraft in the fully open position. The tool is adjustable to provide a precise amount of door opening. The surfaces of the aircraft doors are protected from damage from the tool by a covering of resilient material over the tool in the aircraft contact area. The tool holds the speed brake in the open position for as long as required to fully complete the lubrication, eliminating the need of opening the doors many times by manual effort during the lubrication process, thus, greatly reducing the safety hazard to personnel holding the door and working within the confines of the door.

PRIOR ART

The best known prior art is that contained in U.S. Pat. Nos. 311,716 to patentees Beecher et al.; 980,507 to patentees Forest et al.; 2,557,736 to patentee Fox; and 3,030,061 to patentee Jennings.

BRIEF DESCRIPTION OF THE DRAWING

FIG. 1 is a simplified view of a typical aircraft having speed brakes with the brakes in the closed position;

FIG. 2 is a simplified view of a typical aircraft having speed brakes with the brakes in the open position;

FIG. 3 is a view of a typical embodiment of the invention; and

PREFERRED EMBODIMENT OF THE INVENTION

Figure 4:
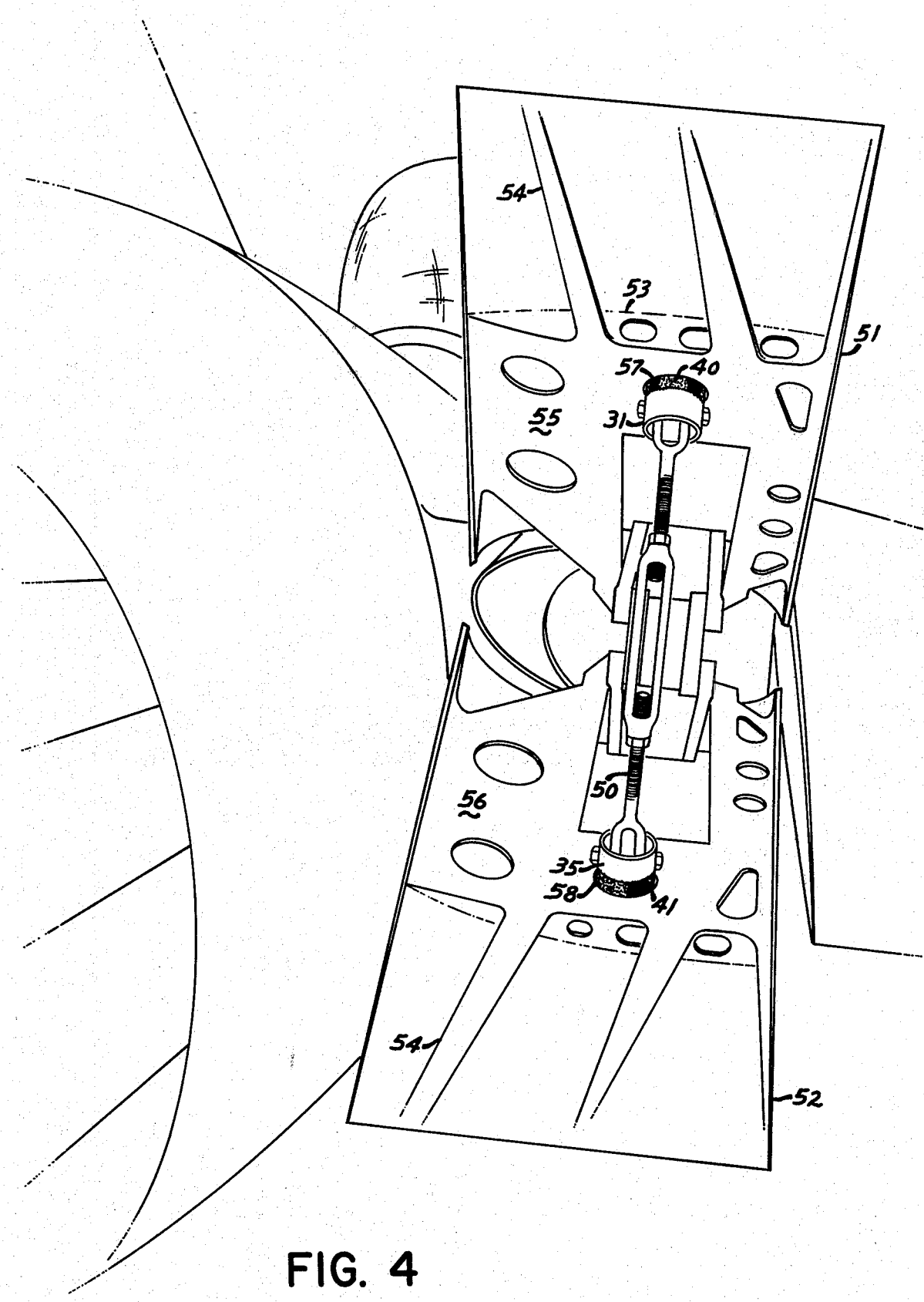
FIG. 4 is a view of a typical embodiment of the invention positioned to hold the speed brake doors of a typical aircraft open.

FIG. 1 schematically illustrates a typical aircraft 11 having typical speed brakes 12 and 13. These speed brakes, as illustrated in FIG. 1, are in the closed or "off" position. In this particular illustrated aircraft, the speed brakes are positioned on each side of the fuselage inboard the horizontal tail surfaces. FIG. 2 schematically illustrates the same aircraft 11, with the speed brakes open (on). Only the port brake 12 is visible in this view, and a part of the port side of the horizontal tail is shown cut away for illustration.

When the aircraft is under power, such as when coming in for a landing, the built-in hydraulic actuators hold the speed brakes open. When it is required to service the speed brake mechanisms, the aircraft is not under power and the speed brake doors must be physically held open against residual hydraulic pressure. In the past, this has been done manually with some physical risk to personnel and with congestion in the area.

A typical embodiment of the invention is illustrated in FIG. 3. It is comprised of a turnbuckle type central frame member 31 having opposite twist threads in each end, i.e., left-hand thread in one and right-hand threads in the other. A pair of yoke members 32, and 33, with each yoke having threads cooperating with a respective end of the frame member 31 extends from the frame member. Tubular members 34 and 35 are pivotably attached to yoke members 32 and 33, respectively, by bolts 36 and 37 passing through holes in the tubular member and eyes in the arms of the yokes. The bolts are secured in place with nuts 38 and 39. Lock washers may be used under the nuts or the nuts may be castellated and secured to the bolts with cotter keys in a conventional manner. Generally, it is desirable that the axial distance from the inner edge of the tubular member to the bolt, and the distance across the outside of the yoke with respect to the inside diameter of the tubular member, be such that the axis of the tubular members may pivot up to approximately 45 degrees either way with respect to the general overall axis of the device, that is, a pivotal rotation through an included angle of approximately 90 degrees. A rubber sleeve 40 and 41 is positioned over the end of each tubular member (34 and 35) and folded inside 42 so that the sides and ends 43 of the tubular member are covered with a resilient material. The resilient material should extend back from the end of the tubular member a sufficient distance such that the metal of the tubular member will not contact the frame member stiffening structure or the underside of the surface sheet (or skin) of the speed brake door. Conventional left and right hand nuts 44 and 45, that are used to lock the transverse axes of the yokes in a common plane prior to insertion of the device in an air brake, have been found generally desirable. After the brake lock is in place, the nuts 44 and 45 are then loosened and the turnbuckle type frame member 31 rotated in the proper direction to further extend or contract the door opening as desired. Generally, it is not required that the speed brake be open the maximum amount of its mechanical travel for servicing, however, it may be desirable to change the amount of opening slightly while servicing.

FIG. 4 illustrates a typical embodiment of the invention 50 in place in a typical speed brake mechanism holding the upper door 51 and the opposed lower door 52 open at an included angle of approximately 90 degrees. Typically, speed brake doors have an outside surface that fairs in with the surface of the air frame (when the brake is closed), and have rib, truss, gusset, and plate reinforcing and stiffening structures such as elements 53, 54, 55, and 56. In order to lighten these structures, lightening holes are placed in them at relatively low stress points. Generally, the upper and lower speed brake doors are symmetrical about their hinge axis and are substantially mirror images of each other. The invention typically utilizes two conveniently located opposed lightening holes 57 and 58 in the upper and lower door stiffeners. After manually opening the speed brake doors, tubular members 34 and 35, of the invention, are positioned in the holes 57 and 58 in the stiffener plates. The rubber boots 40 and 41 prevent the device from marring or deforming the stiffener plates and the surface of the sheet material forming the exterior skin of the brake. After the speed brake lock 50 is thus positioned, the speed brake doors 51 and 52 are released to rest on the lock. A single person can thus install the lock and perform the servicing of the mechanism. Obviously, in use, the lock must be tagged with a red "remove before flight" streamer. Variations in the amount of door opening may readily be made by simply turning the turnbuckle frame member in the conventional manner. Moving or changing the position of the doors is sometimes advantageous during the lubrication process.

The invention is for an adjustable maintenance lock for aircraft speed brakes. The lock has pivotal, cushioned, engaging surfaces that prevent defacing the aircraft and provides relatively uniform stress distribution on the aircraft structure. The invention cooperates with lightening holes in the speed brake structure. The pivoting of the end members of the lock provides substantially a flush contact with the underside of the skin of the brake, with the hold-open thrust taken, not only by the underside of the aircraft surface member of the brake, but also by the brake reinforcing plates contacting the cushioned outer surface of the tubular members at the edges of the lightening holes over a portion of their circumference. Typically, the brake lock is fabricated of steel parts with rubber boot members 40 and 41 covering a portion of the tubular members.

A typical, suitable, lock for the air brakes of a type F-16 aircraft may be comprised of elements having approximately the following dimensions; two pieces of steel tubing 34 and 35 (FIG. 3), each having the approximate dimensions of three and one-half inches long, one-eighth inch thick, and two and one-fourth inches outside diameter. The inner edges of the tubes are rounded and ⅜ inch holes are drilled approximately ⅝ inch from the rounded edges for the bolts 36 and 37. Turnbuckle type member 31 is approximately 7½ to 8 inches long and each yoke member 32 and 33 has approximately three and one-half inches of threads. The overall axial length of each of the yoke members is approximately six and three-fourths inches. The width of the yokes from one side to the other is approximately one and one-half inches. The eyes of the yokes have 13/32 inch holes to provide clearance for rotation on the ⅜ inch bolts 36 and 37 therein. Resilient members 40 and 41 may be fabricated from approximately 3½ inch lengths of conventional bicycle inner tube material.

I claim:

1. A lock mechanism for holding open opposed upper and lower doors of an aircraft speed brake, said upper and lower doors each having a surface sheet and each having an internal stiffening structure with at least a lightening hole in said upper door stiffening structure opposed a lightening hole in said lower door stiffening structure, said lock mechanism comprising:
   a. a turnbuckle type member having a first end with left-hand threads and a second end with right-hand threads;
   b. a first yoke member threadably engaging in adjustable relationship said first end of said turnbuckle type member;
   c. a first locking means cooperating with said first yoke member and said turnbuckle type member for locking the adjustment of said first yoke member with respect to said turnbuckle type member;
   d. a second yoke member threadably engaging in adjustable relationship said second end of said turnbuckle type member;
   e. a second locking means cooperating with said second yoke member and said turnbuckle type member for locking the adjustment of said yoke member with respect to said turnbuckle type member;
   f. a first tubular member for engaging said upper door surface sheet and being of a size for receipt in said lightening hole in said upper door stiffening structure, said first tubular member also being pivotably attached to said first yoke member;
   g. a second tubular member for engaging said lower door surface sheet and being of a size for receipt in said lightening hole in said lower door stiffening structure, said second tubular member also being pivotably attached to said second yoke member; and
   h. a resilient covering extending over the surface of each of said first and second tubular members for contacting said surface sheet and said stiffening structure of said respective upper and lower speed brake doors through said respective lightening holes therein.

2. The speed brake lock mechanism as recited in claim 1, wherein said first tubular member is being pivotally attached to said first yoke member provides a pivotal rotation through approximately 90 degrees, and said second tubular member in being pivotally attached to said second yoke member provides a pivotal rotation through approximately 90 degrees.

* * * * *